US012631734B2

(12) United States Patent
Hattass

(10) Patent No.: US 12,631,734 B2
(45) Date of Patent: May 19, 2026

(54) METHOD FOR OPERATING A LIDAR UNIT

(71) Applicant: Robert Bosch GmbH, Stuttgart (DE)

(72) Inventor: Mirko Hattass, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 971 days.

(21) Appl. No.: 17/871,488

(22) Filed: Jul. 22, 2022

(65) Prior Publication Data

US 2023/0037239 A1 Feb. 2, 2023

(30) Foreign Application Priority Data

Jul. 27, 2021 (DE) ..................... 10 2021 208 089.8

(51) Int. Cl.
*G01S 7/487* (2006.01)
*G01S 7/481* (2006.01)
*G01S 17/88* (2006.01)
(52) U.S. Cl.
CPC ............ *G01S 7/4873* (2013.01); *G01S 7/481* (2013.01); *G01S 17/88* (2013.01)
(58) Field of Classification Search
CPC ........ G01S 7/4873; G01S 17/88; G01S 7/481; G01S 7/4816; G01S 7/4817; G01S 7/484; G01S 7/4863; G01S 7/487; G01S 17/10; G01S 17/42; G01S 17/931; G01S 7/4815

USPC ........................................................ 356/4.01
See application file for complete search history.

(56) References Cited

U.S. PATENT DOCUMENTS

2017/0307759 A1 10/2017 Pei et al.
2021/0124027 A1 4/2021 Holzhuter et al.

FOREIGN PATENT DOCUMENTS

CN 112596042 A 4/2021
DE 102016220468 A1 4/2018

*Primary Examiner* — Daniel L Murphy
(74) *Attorney, Agent, or Firm* — NORTON ROSE FULBRIGHT US LLP

(57) ABSTRACT

An emitter unit is designed to emit segments of electromagnetic radiation temporally offset to one another along a line. A detector includes a plurality of linearly situated detector channels. A first sequence and at least one second sequence of segments are emitted. The sequences differ at least with respect to a temporal distance between two successive segments. First signals and second signals are detected on the basis of segments of the first and second sequence reflected at objects and striking the detector. Signal strengths of first and second signals are added together in order to obtain sum signals for each detection channel. Signal strengths of the sum signals are compared with a predefinable threshold value and identified as real if they are greater than the predefinable threshold value.

11 Claims, 3 Drawing Sheets emit first sequence of segments along a line — 31 detect first signals — 32 emit second sequence of segments along a line — 33 detect second signals — 34 add signal strengths of first and second signals — 35 compare strengths of sum signals with threshold value — 36 identify real signals — 37

30

METHOD FOR OPERATING A LIDAR UNIT

FIELD

The present invention relates to a method for operating a LIDAR unit.

BACKGROUND INFORMATION

Various types of LIDAR systems are described in the related art for distance measurement in the context of automated driving. Scanning LIDAR systems, in particular, in which a laser beam is moved across a setting, have become established. Laser light reflected at objects is imaged again on a detector via receiving optics. The related art also includes, in particular, LIDAR systems, in which individual image points are imaged by activation of individual lasers, which are then able to be measured in each case by one detector per image point. However, these LIDAR systems have the disadvantage that a large number of individual detectors are required, which is why they are complex and cost-intensive.

One further development are so-called line flash LIDAR systems, which emit simultaneously a complete line or a line made up of short sections. The line may be generated in various ways or by various optical elements, for example, by imaging a near field of a laser or particular beam forming optics. A line detector detects the entire line via its individual detection channels. This is frequently also combined by a multiple emissions method, i.e., the line of electromagnetic radiation is emitted multiple times and measured in each case using the detector. The signals obtained per emission of the line are time-synchronously summed and result in a sum signal.

A fundamental problem of this method is the optical cross-talk between individual detection channels of the detector. If, for example, an object having a high reflectivity, for example, a retroreflector or a road sign, is struck by a part of the line, which is then detected by a detection channel of the detector, then scattered light also strikes adjacent detector channels with significant intensity. Within the scope of an evaluation, it is then impossible to discern whether signals in the adjacent detection channels are real or false. This results in an apparent magnification of the object in a 3D point cloud, which represents the object. This effect may even impact all detection channels of the detector, so that punctiform objects appear as elongated objects in the 3D point cloud.

SUMMARY

An object of the present invention is to provide an improved method for operating a LIDAR unit, to provide an improved LIDAR unit and an improved LIDAR system. These objects may be achieved by a method for operating a LIDAR unit including the features of the present invention. Advantageous refinements and embodiment of the present invention are disclosed herein.

In a method for operating a LIDAR unit, the LIDAR unit includes an emitter unit and a detector. The emitter unit is designed to emit electromagnetic radiation in such a way that segments of electromagnetic radiation temporally offset to one another are situated along a line. The detector includes a plurality of detection channels situated linearly and in each case designed for detecting electromagnetic radiation. According to an example embodiment of the present invention, the method includes the following method steps: a first sequence of segments is emitted in such a way that the segments are situated along a line. First signals are detected on the basis of the emitted electromagnetic radiation of the segments of the first sequence, at least partially reflected at objects and at least partially striking the detector. At least one second sequence of segments is emitted in such a way that the segments are situated along a line. The first sequence and the second sequence differ at least with respect to a temporal distance between two successive segments. Two signals are detected on the basis of the emitted electromagnetic radiation of the segments of the second sequence, at least partially reflected at objects and at least partially striking the detector. Signal strengths of the first and second signals are added together in order to obtain sum signals for each detection channel. Signal strengths of the sum signals are compared with at least one predefinable threshold value. Real signals are identified, a sum signal being identified as real if its signal strength is greater than the predefinable threshold value.

The method advantageously makes it possible to be able to distinguish between real signals and undesirable signals, which may be caused by a cross-talk between adjacent detection channels. A cross-talk of adjacent detection channels takes place, in particular, when an emitted segment of electromagnetic radiation strikes an object having a high reflectivity and subsequently strikes at least two adjacent detection channels. If such a cross-talk takes place in a segment which, within the scope of the first sequence, has a temporal distance relative to a directly preceding or following segment different than within the scope of the second sequence, then a cross-talk signal in an adjacent detection channel may be identified as such, since signal strengths of the cross-talk signal in the relevant detection channel do not add up when the different temporal distances are taken into account. As a result, the signal strength of the cross-talk signal does not reach the predefinable threshold value.

In one specific example embodiment of the present invention, the first sequence and the second sequence differ with respect to all temporal distances of two successive segments each. As a result, all signals detected on the basis of the sequences of the segments may be advantageously checked in terms of whether they are real or whether cross-talk signals are involved.

In one specific example embodiment of the present invention, temporal distances of successive segments of a sequence are greater than pulse widths of the segments of the sequence. As a result, signals detected in a detection channel may be advantageously temporally separated from potential cross-talk signals. This enables an identification of real signals.

In one specific example embodiment of the present invention, the emitter unit includes a plurality of emitters situated along a line and designed in each case to emit electromagnetic radiation. The emission of a sequence of segments of electromagnetic radiation takes place via successive and pulsed operation of the emitter.

In one specific example embodiment of the present invention, the emitter unit includes an emitter designed for emitting electromagnetic radiation and a rotationally and/or pivotably mounted deflection mirror. The deflection mirror is provided to reflect pulsed, emitted segments of electromagnetic radiation in such a way that segments of electromagnetic radiation temporally offset to one another are situated along a line.

In one specific example embodiment of the present invention, the emitter unit and the detector are situated on a rotor.

As a result, surroundings of the LIDAR unit may be advantageously scanned to a greater degree.

In one specific example embodiment of the present invention, an optical path between the emitter unit and the detector is designed to be biaxial or coaxial. The LIDAR unit may be advantageously implemented in a space-saving manner in a higher level system due to its biaxial or coaxial optical path.

In one specific example embodiment of the present invention, the LIDAR unit is an integral part of an autonomous motor vehicle, and the method is carried out during operation of the autonomous motor vehicle. The autonomous motor vehicle is advantageously provided with reliable LIDAR data, in which cross-talk signals are reduced or are not present. As a result, the method is able to contribute to an improvement of a control of the autonomous motor vehicle.

According to an example embodiment of the present invention, a LIDAR unit is designed to carry out a method of the present invention. A LIDAR system includes a plurality of LIDAR units. Using a plurality of LIDAR units, it is advantageously possible as a result to generate more precise representations of objects, for example, 3D point clouds, in which artefacts due to cross-talk signals are reduced or are not present.

BRIEF DESCRIPTION OF THE DRAWINGS

The method for operating a LIDAR unit according to the present invention is explained in greater detail below with reference to schematic figures.

DETAILED DESCRIPTION OF EXAMPLE EMBODIMENTS

Figure 1:
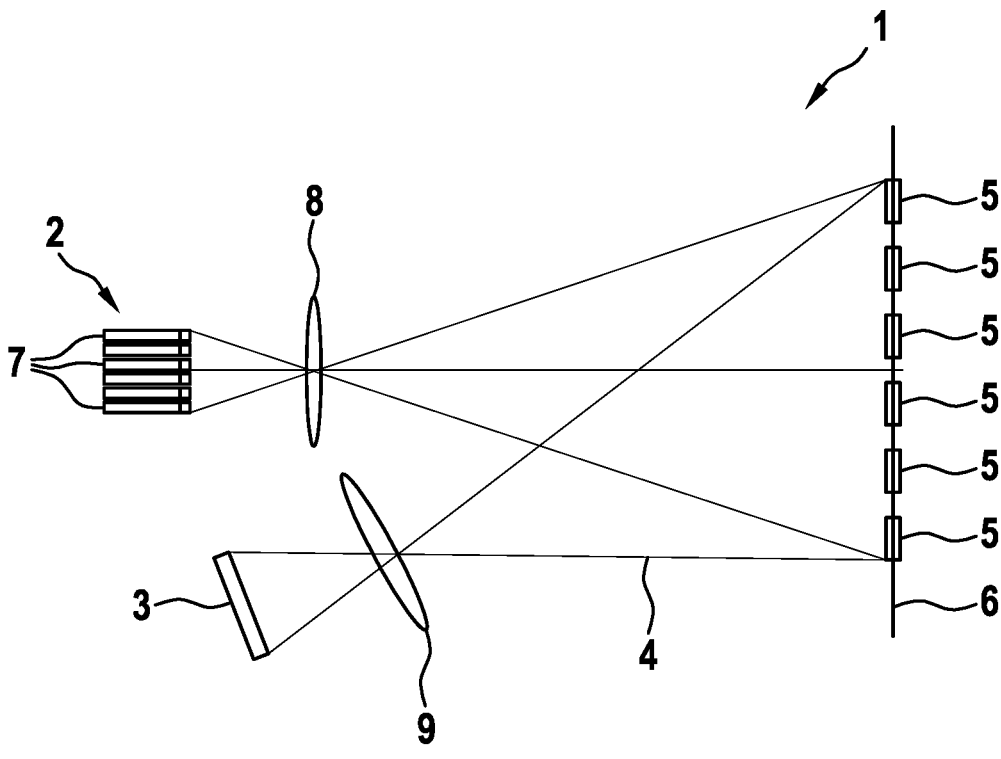
FIG. 1 shows a LIDAR unit, according to an example embodiment of the present invention.

FIG. 1 schematically shows a LIDAR unit 1. LIDAR unit 1 includes an emitter unit 2 and a detector 3. Emitter unit 2 is designed to emit electromagnetic radiation 4 in such a way that segments 5 of electromagnetic radiation temporally offset to one another are situated along a line 6. Detector 3 includes a plurality of detection channels situated linearly and in each case designed for detecting electromagnetic radiation 4. Detector 3 may also be referred to as a line detector. For the sake of simplicity, the individual detection channels of detector 3 are not shown in FIG. 1.

In the specific embodiment of the LIDAR unit 1 of FIG. 1, emitter unit 2 includes a plurality of emitters 7 situated along a line and in each case designed for emitting electromagnetic radiation 4. Emitters 7 may, for example, be designed as lasers. It is also possible, however, that emitters 7 are other sources of electromagnetic radiation 4, for example, light-emitting diodes. The emission of a sequence of segments 5 of electromagnetic radiation 4 takes place via successive and pulsed operation of emitters 7. To activate emitter 2, LIDAR unit 1 includes a control which, for the sake of simplicity, is not shown in FIG. 1. In this way, it is possible to generate a line made up of segments 5 of electromagnetic radiation 4, which are synthesized temporally offset, i.e., segments 5 of the line of electromagnetic radiation 4 are emitted in succession. A temporal distance between two emitted segments 5 may be selected by activating two corresponding emitters 7 at a desired temporal distance relative to one another.

Six emitters 7 are shown by way of example in the representation of FIG. 1, via which a total of six segments 5 may be emitted. The number of segments 5 may, however, be arbitrary. FIG. 1 further shows that segments 5 have a distance relative to one another when they are imaged on a projection surface. However, no distances are required to be present between segments 5. For example, segments 5 may also overlap one another.

In one alternative specific embodiment of the present invention, emitter unit 2 includes an emitter 7 designed for emitting electromagnetic radiation and a rotatably and/or pivotably mounted deflection mirror. The deflection mirror is provided to reflect emitted segments 5 of electromagnetic radiation 4 in such a way that segments 5 of electromagnetic radiation 4 temporally offset to one another are situated along line 6. To activate emitter 2, LIDAR unit 1 also includes a control which, for the sake of simplicity, is not shown in FIG. 1. LIDAR unit 1 in this case further includes a further control for activating the deflection mirror. Such a LIDAR unit 1 also enables the temporally offset synthesizing of a line made up of segments 5 of electromagnetic radiation 4. In this case, a temporal distance between two emitted segments 5 is a function of a frequency of the rotatably and/or pivotally mounted deflection mirror. For the sake of simplicity, the specific embodiment of LIDAR unit 1 including the deflection mirror is not shown in FIG. 1.

LIDAR unit 1 includes a first optical unit 8 and a second optical unit 9. First optical unit 8 is designed to image electromagnetic radiation 4 emitted by emitter unit 2 in such a way that segments 5 of electromagnetic radiation 4 are situated along line 6. Second optical unit 9 is designed to image segments 5 of electromagnetic radiation 4 reflected at objects onto detector 3.

It is advantageous if a number of emitted segments 5 correspond to a number of detection channels. Segments 5 reflected at objects may, for example, each be imaged on a separate detection channel. In this way, a correlation is present between one segment 5 and one detection channel each of detector 3. This may be achieved, for example, in that a number of emitters 7 of emitter unit 2 corresponds to the number of detection channels of detector 3 and segments 5 emitted in each case by emitters 7 may be imaged on separate detection channels. In this way, temporally offset emitted segments 5 may be detected temporally offset to one another by one detection channel each. In general, it is advantageous that each segment or each emitter 7 is assigned to one detection channel, the number of segments or of emitters 7 not having to correspond to the number of detection channels. It may be, for example, that two segments 5 or two emitters 7 are assigned to a shared detection channel or, for example, that a segment 5 or an emitter 7 is assigned to two detection channels by imaging segment 5 in each case in part on adjacent detection channels.

An optical path between emitter unit 2 and detector 3 may be designed to be either biaxial or coaxial as represented in FIG. 1. Emitter unit 2 and detector 3 may also be situated on a rotor not represented, in order to scan surroundings of LIDAR unit 1 with the aid of segments 5 of electromagnetic radiation 4 situated along line 6. LIDAR unit 1 may include an additional control for activating the rotor.

LIDAR unit 1 may also include a plurality of emitter units 2 and a plurality of detectors 3. For the sake of simplicity, this is not represented in FIG. 1. Each of emitter units 2 is designed to emit electromagnetic radiation 4 in such a way that segments 5 of electromagnetic radiation 4 temporally offset to one another are situated along a line 6. Emitter units 2 may, for example, be situated in such a way that segments 5 of emitted electromagnetic radiation 4 of various emitter units 2 are situated along lines 6 extending in parallel to one another. Each of detectors 3 includes a plurality each of detection channels situated linearly and in each case designed for detecting electromagnetic radiation 4, i.e., LIDAR unit 1 includes a plurality of line detectors. The line detectors may, for example, also be situated extending in parallel to one another. The specific embodiment of LIDAR unit 1 including the plurality of emitter units 2 and the plurality of detectors 3 yields the advantage that surroundings are able to be extensively scanned.

LIDAR unit 1 may also be an integral part of a LIDAR system, which includes a plurality of LIDAR units 1. LIDAR unit 1 or the LIDAR system including a plurality of LIDAR units 1 may each be integral parts of an autonomous motor vehicle, for example.

FIG. 2 through FIG. 5 illustrate method steps of a method for operating LIDAR unit 1. The method is based on the idea of distinguishing signals that are generated by a cross-talk in adjacent detection channels from real signals. A cross-talk may occur, for example, when a segment 5 of electromagnetic radiation 4 is reflected at an object having high reflectivity and as a result strikes not just one detection channel. The method may, for example, be carried out during operation of an autonomous motor vehicle, which is equipped with a LIDAR unit 1. In the case of a LIDAR system made up of a plurality of LIDAR units 1, the method may be carried out repeatedly in a parallel manner.

Figure 2:
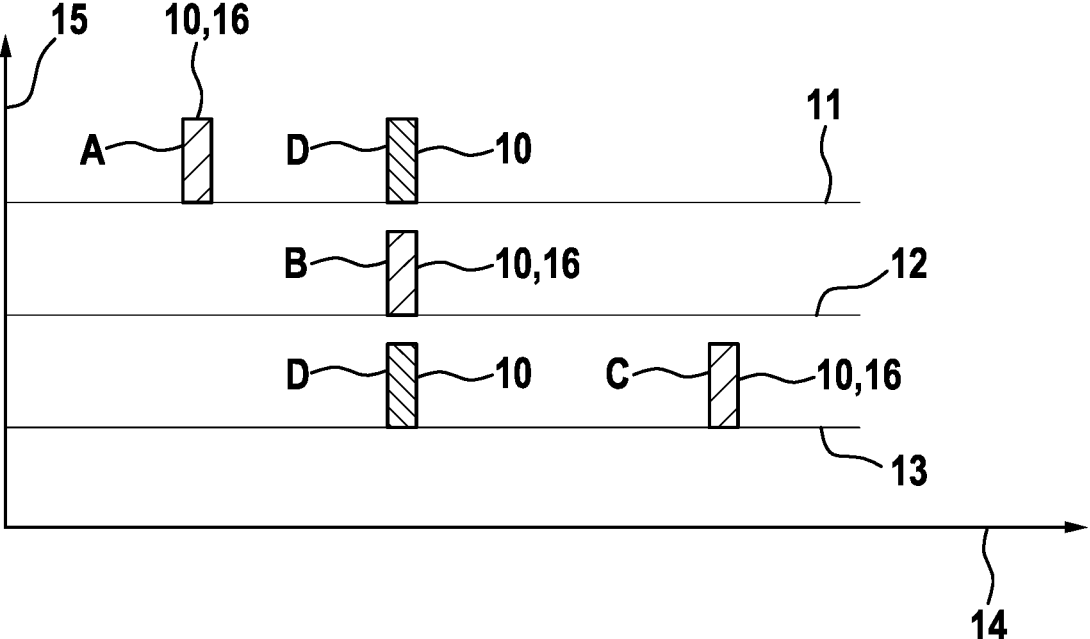
FIG. 2 shows detected signals of a first sequence of segments of electromagnetic radiation, according to an example embodiment of the present invention.

FIG. 2 schematically shows a temporal profile of first signals 10 detected within the scope of the method. A time 14 is plotted on an abscissa. A signal strength 15 is plotted on an ordinate. For the sake of simplicity, only detected first signals 10 of three adjacent detection channels 11, 12, 13 of detectors 3 are shown by way of example. However, the method is not limited to a number of detection channels 11, 12, 13.

Within the scope of one method step of the method, a first sequence 16 of segments 5 has been emitted with the aid of emitter unit 2 in such a way that segments 5 have been situated temporally offset to one another along a line 6, as is shown in FIG. 1. In one further method step, first signals 10 have been detected on the basis of emitted electromagnetic radiation 4 of segments 5 of first sequence 16, at least partially reflected at objects and at least partially striking detector 3. FIG. 2 shows merely by way of example three successive signals 10 of three segments 5 of first sequence 16 of segments 5, which have been emitted temporally offset to one another. In this case, first signals 10 have been detected temporally offset to one another, since they have been emitted temporally offset to one another. Segments 5 may also exhibit different propagation times between emitter unit 2 and detector 3.

A signal A has been detected by a first detection channel 11. A subsequent signal B has been detected temporally offset to signal A by a second detection channel 12 adjacent to first detection channel 11. A further subsequent signal C has been detected temporally offset to signal B by a third detection channel 13 adjacent to second detection channel 12. In addition signal B detected by second detection channel 12, cross-talk signals D have been simultaneously detected by adjacent detection channels 11, 13. Cross-talk signals D were formed by segment 5 of electromagnetic radiation 4 associated with subsequent signal B having been reflected at an object having high reflectivity, as a result of which reflected electromagnetic radiation 4 in each case also struck detection channels 11, 13 adjacent to second detection channel 12 and not only second detection channel 12 detecting subsequent signal B. It may also be, however, that a cross-talk signal D is generated in just one of adjacent detection channels 11, 13. Whether first signals 10 are real signals, i.e., actual echoes, in which electromagnetic radiation 4 has been reflected at objects, and not cross-talk signals D, is in general not initially establishable. The method for operating LIDAR unit 1 advantageously overcomes this problem.

Figure 3:
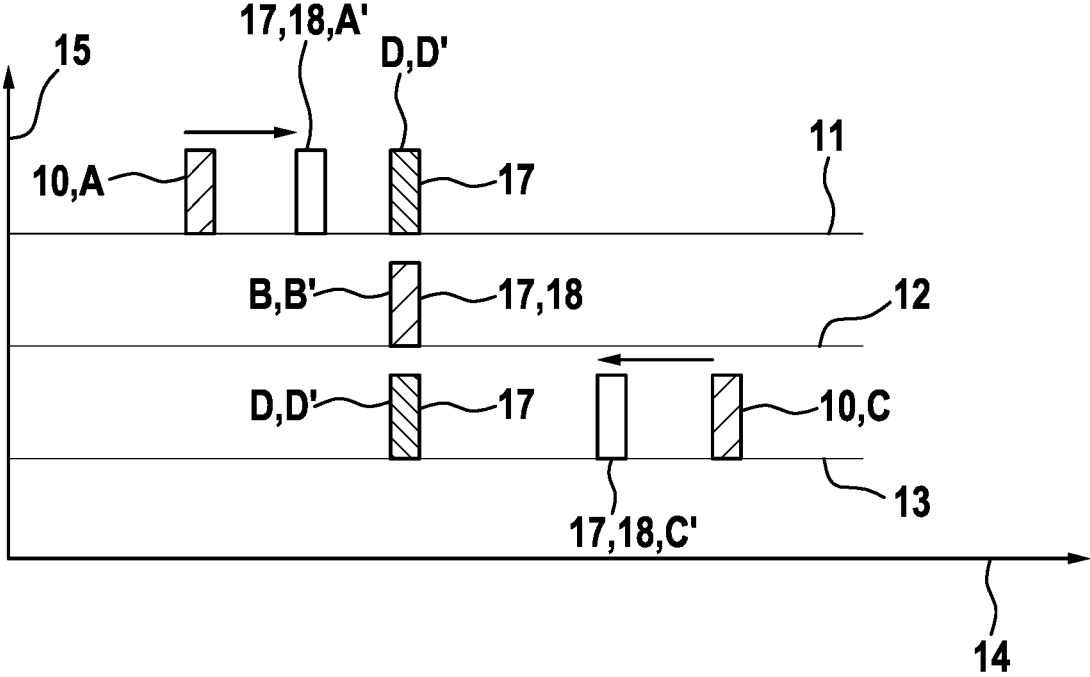
FIG. 3 shows detected signals of a second sequence of segments of electromagnetic radiation, according to an example embodiment of the present invention.

FIG. 3 schematically shows a temporal profile within the scope of the method of detected second signals 17. A time 14 is plotted on an abscissa. A signal strength 15 is plotted on an ordinate. The three detection channels 11, 12, 13 of FIG. 2 are again shown.

Within the scope of one further method step, a second sequence 18 of segments 5 has been emitted with the aid of emitter unit 2 in such a way that segments 5 have been situated temporally offset to one another along a line 6. In one further method step, second signals 17 have been detected on the basis of emitted electromagnetic radiation 4 of segments 5 of second sequence 18, at least partially reflected at objects and at least partially striking detector 3.

Second sequence 18 is emitted after first sequence 16. First sequence 16 and second sequence 18 differ at least with respect to a temporal distance between two successive segments 5. FIG. 3, for example, shows that first sequence 16 and second sequence 18 differ with respect to all temporal distances of two successive segments 5 each of which, however, is not necessarily required. Second sequence 18, for example, has been selected in such a way that the temporal distances between emitted segments 5, and thus between detected second signals 17, are shorter in each case compared to temporal distances between emitted segments 5 of first sequence 16, and thus compared to temporal distances between detected first signals 10. Second sequence 18 may, however, also be differently selected.

A signal A' has been detected by first detection channel 11. A subsequent signal B' has been detected temporally offset to signal A' by second detection channel 12 adjacent to first detection channel 11. A further subsequent signal C' has been detected temporally offset to signal B' by third detection channel 13 adjacent to second detection channel 12. In addition to signal B', 17 detected by second detection channel 12, cross-talk signals D' have again been simultaneously detected by adjacent detection channels 11, 13. For a better understanding, signals A, C of first signals 10, which have been detected by first and third detection channels 11, 13 on the basis of first sequence 16, are also shown in FIG. 3. First signal B, 10 detected by second detection channel 12 and on the basis of first sequence 16, and second signal B' also detected by second detection channel 12 and on the basis of second sequence 18 serve as reference points in the representation of FIG. 3. For this reason, they and associated cross-talk signals D, D' appear simultaneously in adjacent detection channels 11, 13.

Figure 4:
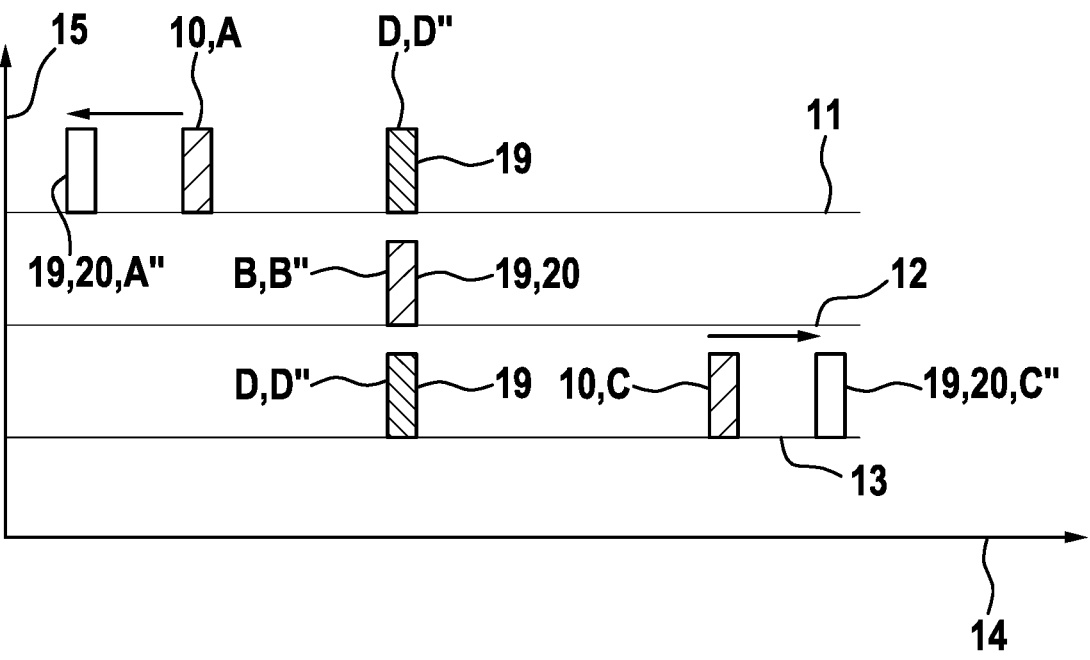
FIG. 4 shows detected signals of a third sequence of segments of electromagnetic radiation, according to an example embodiment of the present invention.

FIG. 4 schematically shows a temporal profile within the scope of the method of detected third signals 19. A time 14 is plotted on an abscissa. A signal strength 15 is plotted on an ordinate. The three detection channels 11, 12, 13 of FIG. 2 are again shown.

Within the scope of one further optional method step, a third sequence 20 of segments 5 has been emitted with the aid of emitter unit 2 in such a way that segments 5 have been situated offset to one another along a line 6. In one further optional method step, third signals 19 have been detected on the basis of the emitted electromagnetic radiation 4 of segments 5 of third sequence 20, at least partially reflected at objects and at least partially striking detector 3.

Third sequence 20 is emitted after second sequence 18. First sequence 16, second sequence 18 and third sequence 20 differ in each case at least with respect to a temporal distance between two successive segments 5. FIG. 4, for example, shows that first sequence 16 and third sequence 20 differ with respect to all temporal distances of two successive segments 5 each of which, however, is not necessarily required. Third sequence 20 has also been selected, for example, in such a way that the temporal distances between emitted segments 5, and thus between detected third signals 19, are greater in each case as compared to temporal distances between emitted segments 5 of first sequence 16, and thus as compared to temporal distances between detected first signals 10. Third sequence 20 may, however, also be differently selected.

A signal A" has been detected by first detection channel 11. A subsequent signal B" has been detected temporally offset to signal A" by second detection channel 12 adjacent to first detection channel 11. One further subsequent signal C" has been detected temporally offset to signal B" by third detection channel 13 adjacent to second detection channel 12. In addition to signal B" detected by second detection channel 12, cross-talk signals D" have again been simultaneously detected by adjacent detection channels 11, 13. For a better understanding, signals A, C of first signals 10, which have been detected by first and third detection channels 11, 13 on the basis of first sequence 16, are also shown in FIG. 4. First signal B, 10 detected by second detection channel 12 and on the basis of first sequence 16, and third signal B", 19 also detected by second detection channel 12 and on the basis of third sequence 20 also serve as reference points in the representation of FIG. 4. For this reason, they and associated cross-talk signals D, D" appear simultaneously in adjacent detection channels 11, 13.

The optional method steps may also be omitted, this means that the emission of at least one first and one second sequence 16, 18 and the detection of first and second signals 10, 17 on the basis of the respectively emitted electromagnetic radiation 4 of segments 5 of first and second sequence 16, 18, in each case at least partially reflected at objects and in each case at least partially striking detector 3, may be sufficient. The use of a third sequence 20 or more sequences is not necessarily required. It is advantageous, however, to use a preferably large variety of sequences, which differ in each case at least with respect to a temporal distance between two successive segments 5. In this way, real signals A, A', A", B, B', B", C, C', C" may be better differentiated from cross-talk signals D, D', D".

Segments 5 of every sequence 16, 18, 20 are emitted in such a way that in each case the same surroundings or the same objects are illuminated. Segments 5 of every sequence 16, 18, 20 are reflected at the objects and in each case strike the same detection channel 11, 12, 13. Each segment 5 is assigned a detection channel 11, 12, 13. For example, each emitter 7 may be assigned a detection channel 11, 12, 13 if emitter unit 2 includes a plurality of emitters 7. For example, signals A, A', A" are based on one segment 5 each of a sequence 16, 18, 20, which strikes first detection channel 11 in each case. Signals B, B', B" are based on one segment 5 each of a sequence 16, 18, 20, which strikes second detection channel 12 in each case. Signals C, C', C" are based on one segment 5 each of a sequence 16, 18, 20, which strikes third detection channel 13 in each case.

The temporal distances between segments 5 of a sequence 16, 18, 20 may be arbitrarily selected. For example, they may be equidistantly or, for example, statistically distributed. The temporal distances of successive segments 5 of a sequence 16, 18, 20 should, however, typically be greater than pulse widths of segments 5 of the sequence. This may ensure that signals 10, 17, 19 are able to be temporally resolved separately from one another by detector 3.

Figures 5, 6:
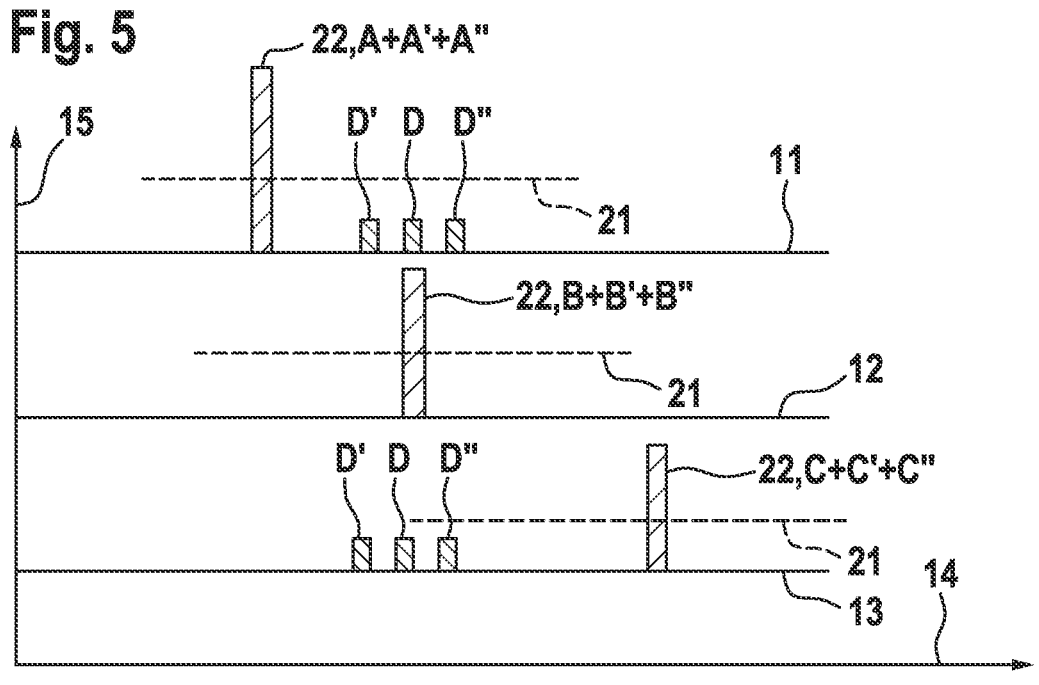
FIG. 5 shows sum signals of the detected signals taking different temporal distances between the segments of different sequences into account, according to an example embodiment of the present invention.
FIG. 6 shows method steps of an example method for operating the LIDAR unit, according to the present invention.

In one further method step, signal strengths 15 of first and of second signals 10, 17 and optionally of third signals 19 and of further signals are added together in order to obtain sum signals 22 for each detection channel 11, 12, 13. FIG. 5 shows ascertained sum signals 22 for each detection channel 11, 12, 13, first, second and third sequence 16, 18, 20 of FIG. 2 through 4 having been used, for example. A time 14 is plotted on an abscissa. A signal strength 15 is plotted on an ordinate.

Sum signal 22 of first detection channel 11 has a signal strength 15, which is made up of signal strengths 15 of signals A, A', and A". Sum signal 22 of second detection signal 12 has a signal strength 15, which is made up of signal strengths 15 of signals B, B', and B". Sum signals 22 of third detection channel 13 have a signal strength 15, which is made up of signals strengths 15 of signals C, C', and C". Cross-talk signals D generated on the basis of first sequence 16 appear in first and in second detection channel 11, 13, in each case simultaneously with sum signal 22 of second detection channel 12. Cross-talk signals D' generated on the basis of second sequence 18 appear in each case before sum signal 22 of second detection channel 12 due to the selection of second sequence 18 in first and in second detection channel 11, 13. Cross-talk signals D" generated on the basis of third sequence 20 appear in each case after sum signal 22 of second detection channel 12 due to the selection of third sequence 20 in first and in second detection channel 11, 13. In fact, cross-talk signals D, D', D" appear in detection channels 11, 13 adjacent to second detection channel 12 simultaneously with signals B, B', B", which are detected by second detection channel 12. Signal strengths 15 of respective cross-talk signals D, D', D" in first and third detection channel 13 are thus not added together, and therefore appear in temporal succession in the representation of FIG. 5 for respective detection channels 11, 12, 13.

To add together the signal strengths of first, second, third and, if necessary, further signals 10, 17, 19, it is therefore necessary to determine for each detection channel 11, 12, 13 and for each sequence 16, 18, 20 a temporal offset of a segment 5 assigned to respective detection channel 11, 12, 13 in relation to a time reference. The temporal offset results in each case from the temporal sequence of emitted segments 5 of a sequence 16, 18, 20 and in relation to the time reference. For example, a selected signal 10, 17, 19 of a sequence 16, 18, 20 may serve as a time reference, for example, a first signal 10 of first sequence 16, which is initially detected. Each detected signal 10, 17, 19 of every detection channel 11, 12, 13 is then shifted by a respective negative of the determined time offset, as a result of which signals 10, 17, 19, which are assigned to a specific detection channel 11, 12, 13, appear simultaneously in the relevant detection channel 11, 12, 13 and their signal strengths 15 contribute to respective sum signal 22. In this case, a temporal offset between emitted sequences 16, 18, 20 must be taken into account. Since cross-talk signals D, D', D" of a respective detection channel 11, 12, 13 are also shifted by the respective negative of the determined time offset, and their respective temporal distances to real signals A, A', A", B, B', B", C, C', C" of respective relevant detection channel 11, 12, 13 may be different due to different temporal distances between emitted segments 5, cross-talk signals D, D', D" in these cases are distributed at different formal detection points in time. For this reason, their signal strengths 15 do not add up.

In one further method step, signal strengths 15 of sum signals 22 are compared with at least one predefinable threshold value 21. It is possible that sum signals 22 of every detection channel 11, 12, 13 of detector 3 are compared with a separate predefinable threshold value 21 in each case. In one further method step, real signals A, A', A", B, B', B", C, C', C" are identified. A sum signal 22 is considered to be real if its signal strength 15 is greater than predefinable threshold value 21. FIG. 5 shows that cross-talk signals D, D', D" in each case do not exceed predefinable threshold value 21. For this reason, they may be identified as cross-talk signals D, D', D". LIDAR unit 1 includes an evaluation unit for adding together signal strengths 15 in order to obtain sum signals 22, and for comparing signal strengths 15 of sum signals 22 with predefinable threshold values 21.

FIG. 6 schematically shows method steps 31, 32, 33, 34, 35, 36, 37 of method 30 for operating the LIDAR unit 1 of FIG. 1, which has previously been explained with reference to FIG. 2 through FIG. 5.

In one first method step 31, first sequence 16 of segments 5 is emitted in such a way that segments 5 are situated along a line 6. In a second method step 32, first signals 10 are detected on the basis of emitted electromagnetic radiation 4 of segments 5 of first sequence 16, at least partially reflected at objects and at least partially striking detector 3. In a third method step 33, at least second sequence 18 of segments 5 is emitted in such a way that segments 5 are situated along a line 6. First sequence 16 and second sequence 18 differ at least with respect to a temporal distance between two successive segments 5. In a fourth method step 34, second signals 17 are detected on the basis of emitted electromagnetic radiation 4 of segments 5 of second sequence 18, at least partially reflected at objects and at least partially striking detector 3. In a fifth method step 35, signal strengths 15 of first and of second signals 10, 17 are added together in order to obtain sum signals 22 for each detection channel 11, 12, 13. In a sixth method step 36, signal strengths 15 of sum signals 22 are compared with at least one predefinable threshold value 21. In a seventh method step 37, real signals are identified, a sum signal 22 being identified as real if its signal strength 15 is greater than predefinable threshold value 21.

What is claimed is:

1. A method for operating a LIDAR unit, the LIDAR unit including an emitter unit and a detector, the emitter unit being configured to emit electromagnetic radiation in such a way that segments of electromagnetic radiation are spatially and temporally offset to one another, the detector including a plurality of detection channels, each of the plurality of detection channels being configured to detect electromagnetic radiation, the method comprising the following steps:
   emitting a first sequence of segments of electromagnetic radiation;
   detecting first signals based on emitted electromagnetic radiation of the segments of the first sequence, at least partially reflected at objects and at least partially striking the detector;
   emitting at least one second sequence of segments of electromagnetic radiation, the first sequence and the second sequence differing at least with respect to a temporal distance between two successive segments;
   detecting second signals based on the emitted electromagnetic radiation of the segments of the second sequence, at least partially reflected at objects and at least partially striking the detector;
   adding together signal strengths of first signals and of second signals to obtain sum signals for each detection channel;
   comparing signal strengths of the sum signals with at least one predefined threshold value; and
   identifying each of the sum signals that are greater than the predefined threshold value as real signals.

2. The method as recited in claim 1, wherein the first sequence and the second sequence differ with respect to all temporal distances between each two successive segments.

3. The method as recited in claim 1, wherein temporal distances between successive respective segments of each of the first and second sequences are greater than pulse widths of the respective segments of the first and second sequence.

4. The method as recited in claim 1, wherein the emitter unit includes a plurality of emitters and each of the emitters is configured to emit electromagnetic radiation, the emission of each of the first and second sequences of segments of electromagnetic radiation taking place via successive and pulsed operation of the emitters.

5. The method as recited in claim 1, wherein the emitter unit includes an emitter configured to emit electromagnetic radiation, and a rotatably and/or pivotably mounted deflection mirror, the deflection mirror being configured to reflect pulsed emitted segments of electromagnetic radiation in such a way that the segments of electromagnetic radiation are spatially and temporally offset to one another.

6. The method as recited in claim 1, wherein the emitter unit and the detector are situated on a rotor.

7. The method as recited in claim 1, wherein an optical path between the emitter unit and the detector is biaxial or coaxial.

8. The method as recited in claim 1, wherein the LIDAR unit is a part of an autonomous motor vehicle and the method is carried out during operation of the autonomous motor vehicle.

9. The method as recited in claim 1, further comprising identifying each of the sum signals that are less than the predefined threshold value as crosstalk signals.

10. A LIDAR unit, comprising:
   an emitter unit; and
   a detector,
   wherein the emitter unit is configured to emit electromagnetic radiation in such a way that segments of electromagnetic radiation are spatially and temporally offset to one another,
   wherein the detector includes a plurality of detection channels, each of the plurality of detection channels being configured to detect electromagnetic radiation, and
   wherein the LIDAR unit is configured to:

emit a first sequence of segments of electromagnetic radiation;

detect first signals based on emitted electromagnetic radiation of the segments of the first sequence, at least partially reflected at objects and at least partially striking the detector;

emit at least one second sequence of segments of electromagnetic radiation, the first sequence and the second sequence differing at least with respect to a temporal distance between two successive segments;

detect second signals based on the emitted electromagnetic radiation of the segments of the second sequence, at least partially reflected at objects and at least partially striking the detector;

add together signal strengths of first signals and of second signals to obtain sum signals for each detection channel;

compare signal strengths of the sum signals with at least one predefined threshold value; and identify each of the sum signals that are greater than the predefined threshold value as real signals.

11. A LIDAR system, comprising:

a plurality of LIDAR units, each of the LIDAR units including:

an emitter unit; and a detector, wherein the emitter unit is configured to emit electromagnetic radiation in such a way that segments of electromagnetic radiation are spatially and temporally offset to one another, and wherein the detector includes a plurality of detection channels, each of the plurality of detection channels being configured to detect electromagnetic radiation, wherein each of the LIDAR units is configured to:

emit a first sequence of segments of electromagnetic radiation;

detect first signals based on emitted electromagnetic radiation of the segments of the first sequence, at least partially reflected at objects and at least partially striking the detector;

emit at least one second sequence of segments of electromagnetic radiation, the first sequence and the second sequence differing at least with respect to a temporal distance between two successive segments;

detect second signals based on the emitted electromagnetic radiation of the segments of the second sequence, at least partially reflected at objects and at least partially striking the detector;

add together signal strengths of first signals and of second signals to obtain sum signals for each detection channel;

compare signal strengths of the sum signals with at least one predefined threshold value; and identify each of the sum signals that are greater than the predefined threshold value as real signals.

* * * * *